United States Patent [19]
Coleman et al.

[11] Patent Number: 5,915,290
[45] Date of Patent: Jun. 22, 1999

[54] INTEGRAL WEAPONS LOADING HOIST AND BOMB RACK INTERFACE UNIT

[75] Inventors: Keith A. Coleman, Wildwood; Thaddeus Jakubowski, Jr., St. Charles, both of Mo.

[73] Assignee: McDonnell Douglas Corporation, St. Louis, Mo.

[21] Appl. No.: 08/950,995

[22] Filed: Oct. 15, 1997

[51] Int. Cl.[6] .................................................. B64D 1/04
[52] U.S. Cl. ........................................... 89/1.59; 89/1.51
[58] Field of Search .................................. 89/1.59, 1.53, 89/1.54, 1.55, 1.56, 1.57, 1.58, 1.51; 244/137.4, 118.1

[56] References Cited

U.S. PATENT DOCUMENTS

| | | | |
|---|---|---|---|
| 2,604,353 | 7/1952 | Pierson et al. | 89/1.53 |
| 3,268,188 | 8/1966 | La Roe et al. | 89/1.51 |
| 3,719,338 | 3/1973 | Ruggeri | 244/137.4 |
| 4,318,561 | 3/1982 | Hasquenoph et al. | 89/1.53 |
| 4,407,180 | 10/1983 | Regnat | 89/1.53 |
| 4,600,171 | 7/1986 | Kalisz | 89/1.59 |

*Primary Examiner*—Charles T. Jordan
*Assistant Examiner*—Theresa M. Wesson
*Attorney, Agent, or Firm*—Westerlund & Powell, P.C.; Robert A. Westerlund; Raymond H. J. Powell, Jr.

[57] ABSTRACT

The present invention relates to an integral hoist and weapon rack interface assembly adaptable for loading a weapon onto an aircraft. The assembly includes a hoist mechanism positioned at an aircraft weapon station and a separate rack attached to the hoist by straps is lowered into contact with the weapon. After the weapon is attached to the rack, the combination of weapon and rack are raised into engagement with a structural plate supporting the hoist mechanism. A plurality of uplock hooks mounted on the plate automatically engage swaybraces mounted on the rack to mechanically lock the rack to the hoist.

18 Claims, 5 Drawing Sheets

INTEGRAL WEAPONS LOADING HOIST AND BOMB RACK INTERFACE UNIT

BACKGROUND OF THE INVENTION

The present invention is related to unique Ground Support Equipment (GSE) and, in particular, to an integral hoist and bomb rack assembly which eliminates the need for a separate hoist or jack assembly for transporting a bomb or missile onto a bomb or missile rack fixedly attached to the aircraft.

Currently, stores, i.e. bombs and missiles, must be transported into position for maintaining respective bomb or missile racks by known lifting devices such as the USN Single Hoist Ordinance Loading System (SHOLS), the USAF MJ-1 Jammer, and a USMS loader. These lifting systems are very large, heavy, logistically difficult to manage, and must accompany flight squadrons to deployment locations in order to be available to load weapons onto the aircraft bomb and/or missile racks. In each of these conventional loading systems, the stores or missiles are either hoisted into engagement with the bomb rack by a separate hoist assembly or raised into position by a jack assembly moved beneath the rack. The hoist can be mounted in the aircraft or be removed after loading the weapons. If a separate hoist is employed, it must be available wherever the deployed aircraft is armed.

A further drawback of conventional loading systems is the inability to carry a large variety of stores as may be required. As will be seen, the present invention provides a combined loading and rack assembly which can be employed regardless of variations in size and shape of the munitions, provided only that the rack can be attached to the store before lifting the store into the bomb bay.

Conventional ground support equipment used to support advanced internal weapon carriages may require the overall aircraft size to be unnecessarily large to accommodate clearances for the loading systems. In effect, the bomb hoist equipment becomes one of the design criteria for the aircraft and can unduly limit aircraft performance.

What is clearly needed is a simplified hoist and rack assembly for lifting and securing the stores or missiles within a bomb bay or beneath wing pylons of a military aircraft. As will become evident, the present invention provides a unique hoist and rack assembly constructed as an integral unit which fulfills these needs without requiring a large, cumbersome separate hoist or jack assembly as required in existing GSE.

SUMMARY OF THE INVENTION

The integral hoist and bomb rack interface assembly constructed in accordance with the present invention comprises a lightweight, approximately 100 lb., aircraft mounted integral hoist and rack system. The integral hoist and bomb rack assembly eliminates all dedicated flightline Support Equipment, reducing required USAF airlift assets by 0.7 C-141's per squadron deployment. Weapon turnaround times are significantly improved by up to 3.1 minutes per weapon station. Overall aircraft size may be reduced due to the corresponding weapon bay size reduction accomplished by the elimination of the large loading access volume required by permanently mounted ceiling racks. The integral hoist and bomb rack assembly of the present invention could additionally be incorporated into aircraft weapon pylons through modification of the structural fitting or by making the components integral to the pylon structure. As with the bomb bay, all of the previously mentioned advantages are believed to exist with a pylon mounted assembly.

The integral hoist and bomb rack is preferably attached to the ceiling of an internal weapons bay or beneath a wing pylon with one rack assembly located at each weapon station. The hoist and bomb rack assembly is preferably driven by electric power with a manual powered back-up drive. However, it is within the scope of the present invention to employ any motive means for powering the hoist. The assembly preferably includes an electric hoist motor, a planetary gear reduction system and an uplock hook mechanism mounted on a structural fitting which takes the shape of a plate that is, itself, permanently attached to the weapon bay ceiling or beneath the aircraft pylon. The uplock hooks releasably secure a separate, movable bomb rack, to the structural fitting. Unique swaybrace fittings and wedges mounted on the rack engage the uplock hook mechanism and prevent undesired separation of the bomb rack from the structural fitting. A plurality (preferably 4) of separate hoist straps extend from separate spools rotatably mounted on the structural fitting into engagement with fittings mounted on the rack. The straps function to selectively lower and raise the bomb rack from the permanently positioned structural fitting as will be explained in detail herebelow.

In order to load a store, i.e. bomb or missile, into the bomb bay, the ordnance crew remotely initiates the loading/unloading sequence. A linear actuator is energized to drive an overcenter mechanism from its locked to its unlocked position. The overcenter mechanism, in turn, moves four (4) uplock hooks, including a first pair of hooks disposed at the forward end of the structural fitting and a second pair of hooks disposed at the aft end of the structural fitting, out of engagement with four (4) separate swaybraces attached on opposite sides of the bomb rack. After the uplock hooks are pivoted to their unlocked positions out of engagement with the respective swaybraces, the straps provide the only remaining connection between the structural fitting and the movable bomb rack.

Preferably, the bomb rack is attached to the hoist by four separate hoist straps, each wound on a separate spool mounted on the structural fitting. The straps may be constructed of any high tensile material, such as Kevlar. It is to be understood that the load supportable by the straps is a direct consequence of the material and size of the hoist straps. It is considered within the scope of the present invention to substitute any known material for Kevlar and to vary the size of the straps or even substitute cables formed of wire or similar material for the Kevlar straps if desired.

After the uplock hooks separate from the swaybraces, the hoist motor lowers the bomb rack from the structural fitting. To simplify operation of the integral hoist and bomb rack assembly, all store-to-rack electrical, mechanical and safing interfaces are located outside the bomb bay. Once the bomb rack is lowered onto the store, wedges located on the swaybraces are manually cocked.

Upon attachment of fore and aft hooks mounted on the bomb rack to bail lugs or missile rails attached to the store, the rack and attached store can be raised into the bomb bay. The particular type of lugs mounted on the store and hooks mounted on the rack make up no part of the present invention. In U.S. patent application Ser. No. 08/927,199, filed Sep. 11, 1997 by the same inventor as the present invention and entitled "Suspension and Release Rack Apparatus Capable of Carrying Both Bombs and Missiles," and incorporated herein by reference thereto, a bomb rack is disclosed which incorporates engagement hooks capable of engaging either bomb mounted bail lugs or missile mounted rail lugs. Whether such an assembly is used or a conventional rack is employed, in either case, the rack is first attached to the store before lifting the store into the bomb bay.

Once the missile or bomb is attached to the rack, the electric hoist is again energized to rewind the four straps onto their respective spools. This raises the bomb rack and attached store until the rack engages the structural fitting. Upon the rack reaching its final position, the wedges mounted on the swaybraces engage the structural fitting and are automatically tripped, driving the wedges against the structural fitting, automatically bracing the bomb rack into its secured position against the structural fitting. In effect, each of the wedges acts to "snug" the swaybraces against movement relative to the fitting. An example of how such a wedge can be employed to brace a lug is described in U.S. Pat. No. 3,268,188 issued to E. T. La Roe et al in August 1966, which patent is herein incorporated by reference.

After each of the four (4) uplock hooks simultaneously engages a separate swaybrace, the overcenter mechanism automatically pivots all the uplock hooks into their respective locked positions, thereby mechanically reconnecting the structural fitting to the bomb rack. The tripped wedges prevent the uplock hooks from separating from their respective swaybraces should the rack begin to tip at either end under the position of the attached store.

The linear actuator drives an electrical connector to complete an aircraft-to-bomb rack electrical interface. If it becomes necessary to download a store from the bomb bay, the above process is repeated by first disengaging the electrical connector, unlocking the uplock hook safety lock and disengaging the uplock hooks from their respective protruding members before engaging the hoist to lower the bomb rack. If the electrical hoist fails to function or the aircraft lacks power, a manual speed wrench interface provided in the structural fitting allows for manually turning the spools to lower and/or raise the rack relative to the structural fitting. While the linear actuator functions to move the uplock hooks to their release positions, the overcenter mechanism automatically relocks the uplock hooks upon engagement with the protruding members.

Novel features of the present invention include: (1) the ability to allow for the "blind" loading of a bomb rack into the bomb bay as well as providing for "blind," self connecting bomb rack-to-aircraft electrical interfaces (pneumatic interfaces for advanced bomb rack), (2) the ability of the swaybrace wedge to provide semi-automatic bomb-to-aircraft swaybracing to maintain the rack and bomb in place against the structural fitting, and (3) the use of low profile straps formed of Kevlar or the like to significantly reduce the size of the spools needed for holding the straps.

BRIEF DESCRIPTION OF THE DRAWINGS

For a better understanding of the present invention, one embodiment thereof will be described hereafter in greater detail with reference to the accompanying drawings in which.

DETAILED DESCRIPTION OF THE PREFERRED EMBODIMENT

Figure 1:
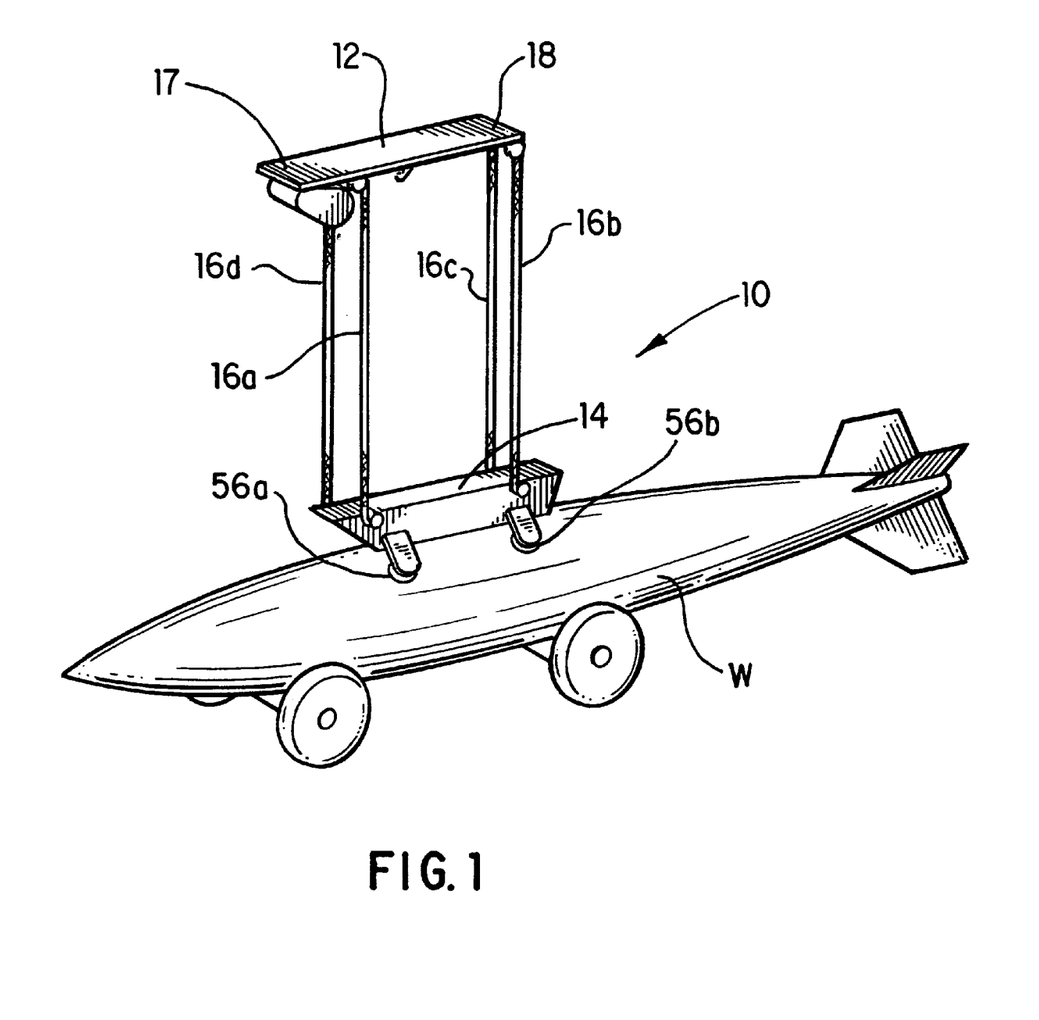
FIG. 1 is a schematic view of an integral hoist and bomb rack assembly constructed in accordance with the present invention.

Reference is made to the drawings, and to FIG. 1 in particular, wherein an integral hoist and rack assembly is identified at 10. Included in assembly 10 is a structural fitting 12 and a separate rack 14. Fitting 12 preferably takes the form of an elongated, generally rectangular plate 13, best shown in FIG. 3. Fitting 12 is permanently attached to the ceiling of a bomb bay or beneath an aircraft pylon, not shown, with a separate fitting 12 positioned at each weapon station. As shown in FIG. 1, four (4) separate straps 16a, 16b 16c and 16d each extend between fitting 12 and bomb rack 14. Straps 16a and 16d are disposed opposite from one another and each strap extends in a downwardly direction from a forward end portion 17 of fitting 12 into engagement with rack 14. In a similar manner, straps 16b and 16c are disposed opposite from one another and each strap extends in a downwardly direction from an aft portion 18 of fitting 12 into engagement with bomb rack 14.

Figure 2:
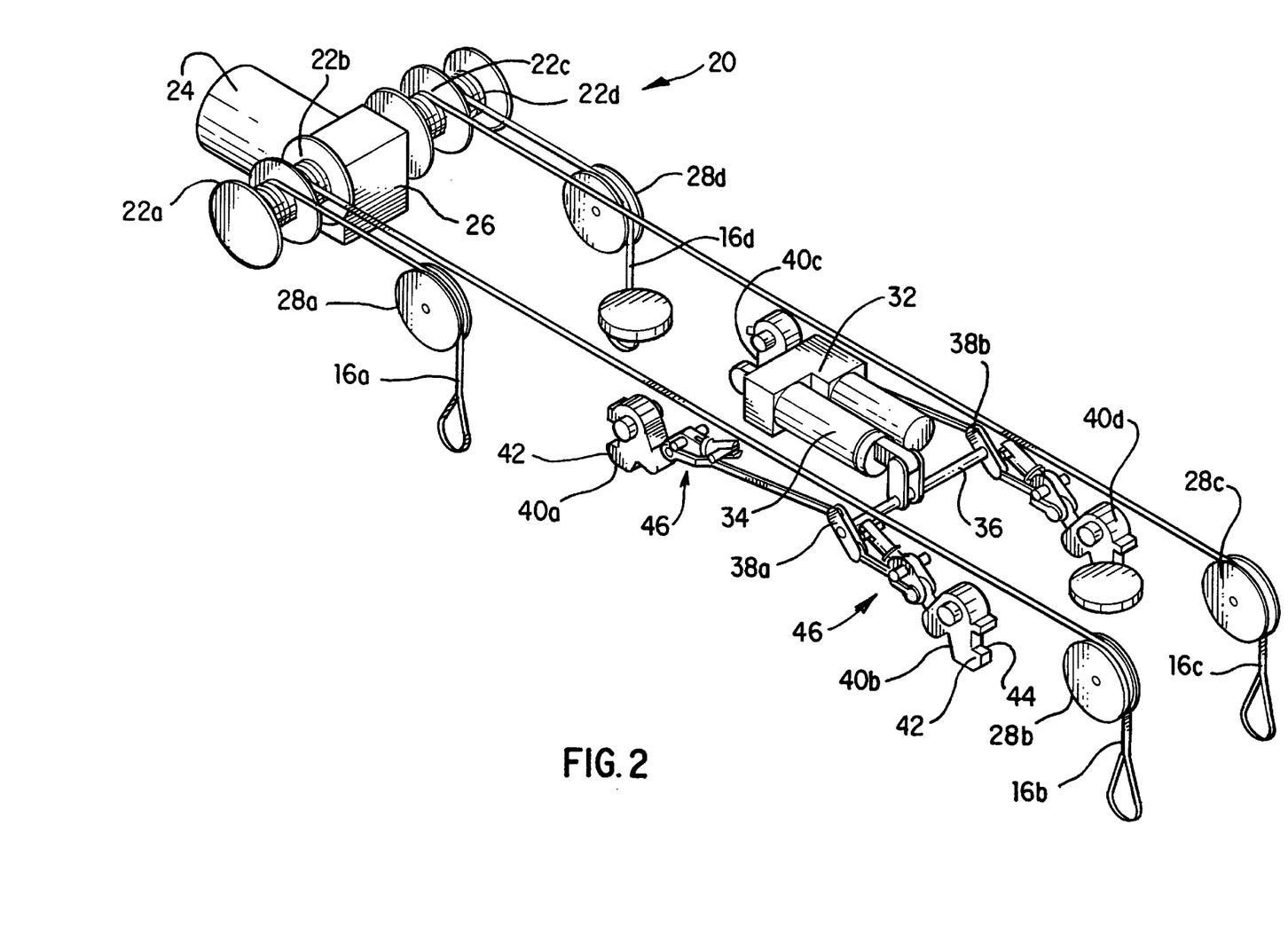
FIG. 2 is an exploded view of the hoist mechanism constructed in accordance with the present invention.
Figure 4:
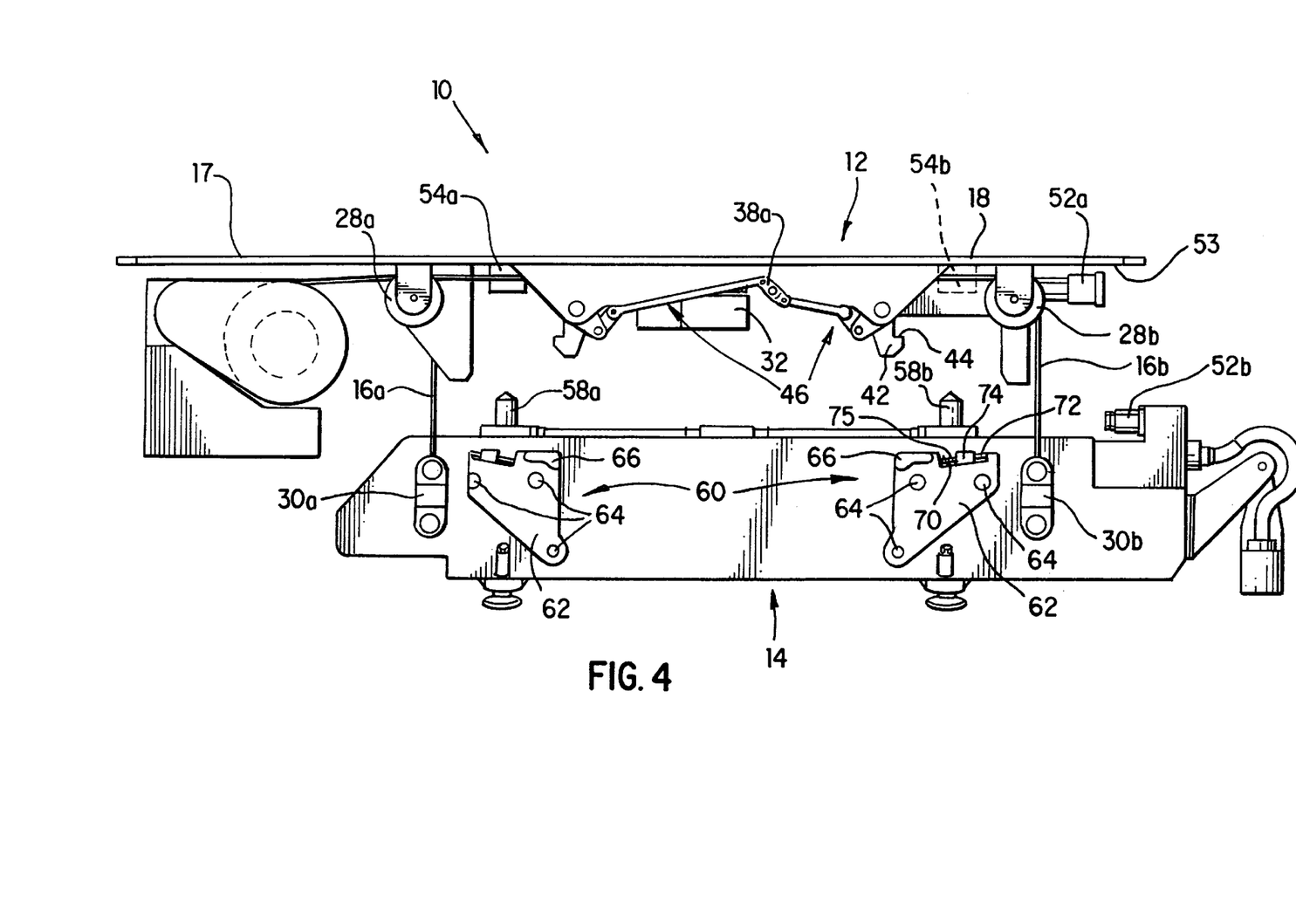
FIG. 4 is a side view of the hoist and bomb rack of FIG. 3.

As best shown in FIG. 2, a hoist mechanism 20 includes a plurality of retrieval spools 22a–22d and an electric motor 24 as well as the straps 16a–16d. Hoist mechanism 20, as shown in FIG. 4, is mounted on the bottom surface 53 of fitting plate 13 which, itself, is attached to the ceiling of the bomb bay or beneath a wing pylon, not shown. Hoist mechanism 20 preferably includes four (4) separate retrieval spools 22a, 22b, 22c and 22d, respectively. The retrieval spools are mounted end-to-end along a common axis and are located at the forward end portion 17 of fitting plate 13. The electric motor 24 includes a conventional output shaft, not shown, which engages a gear box 26 whose output rotates each of the spools 22a–22d through a common drive shaft. A manual interface is provided for rotating spools 22a–22d should electric motor 24 not be operable.

Figure 3:
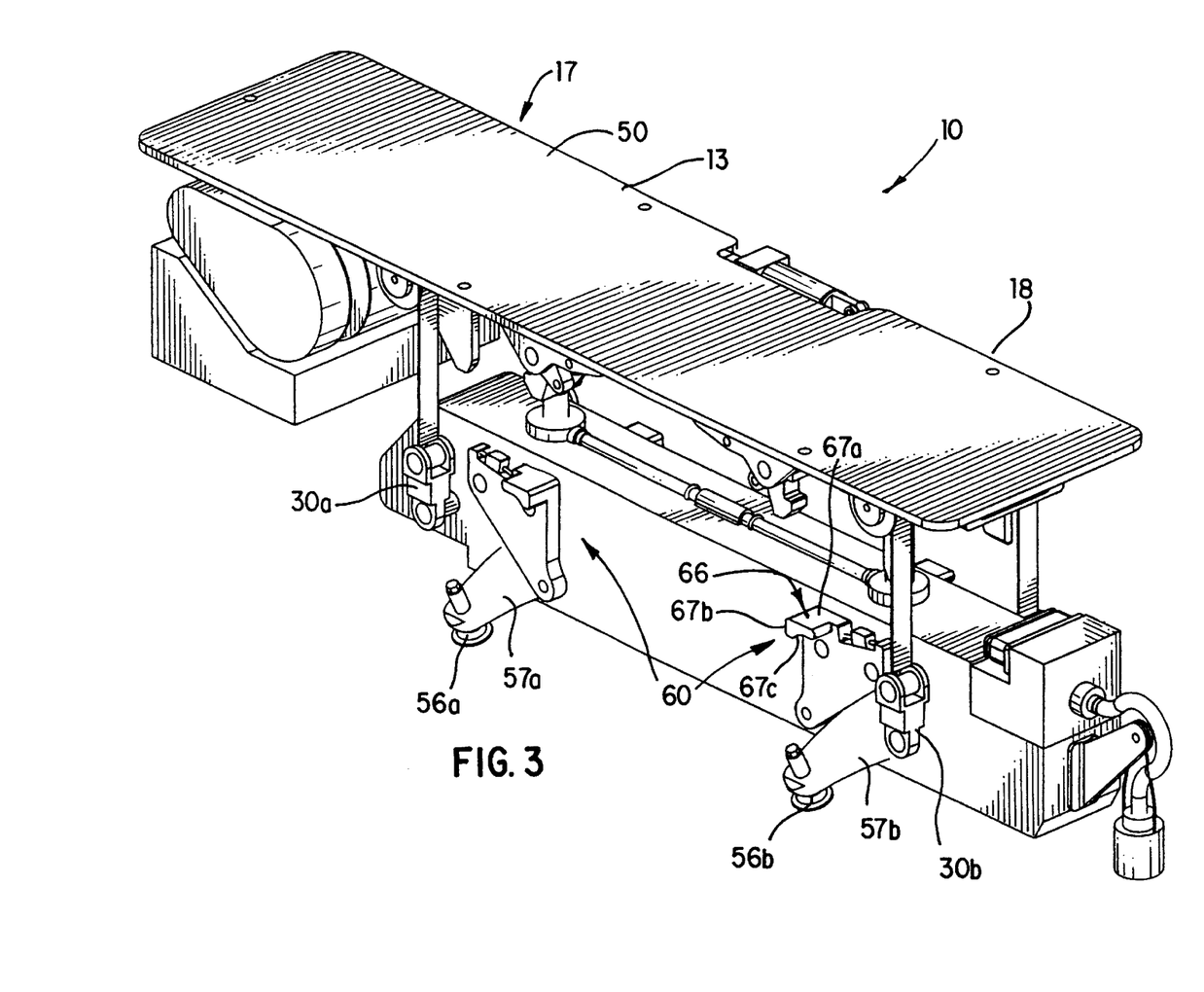
FIG. 3 is a perspective view of the integral hoist and bomb rack of FIG. 1.
Figure 5:
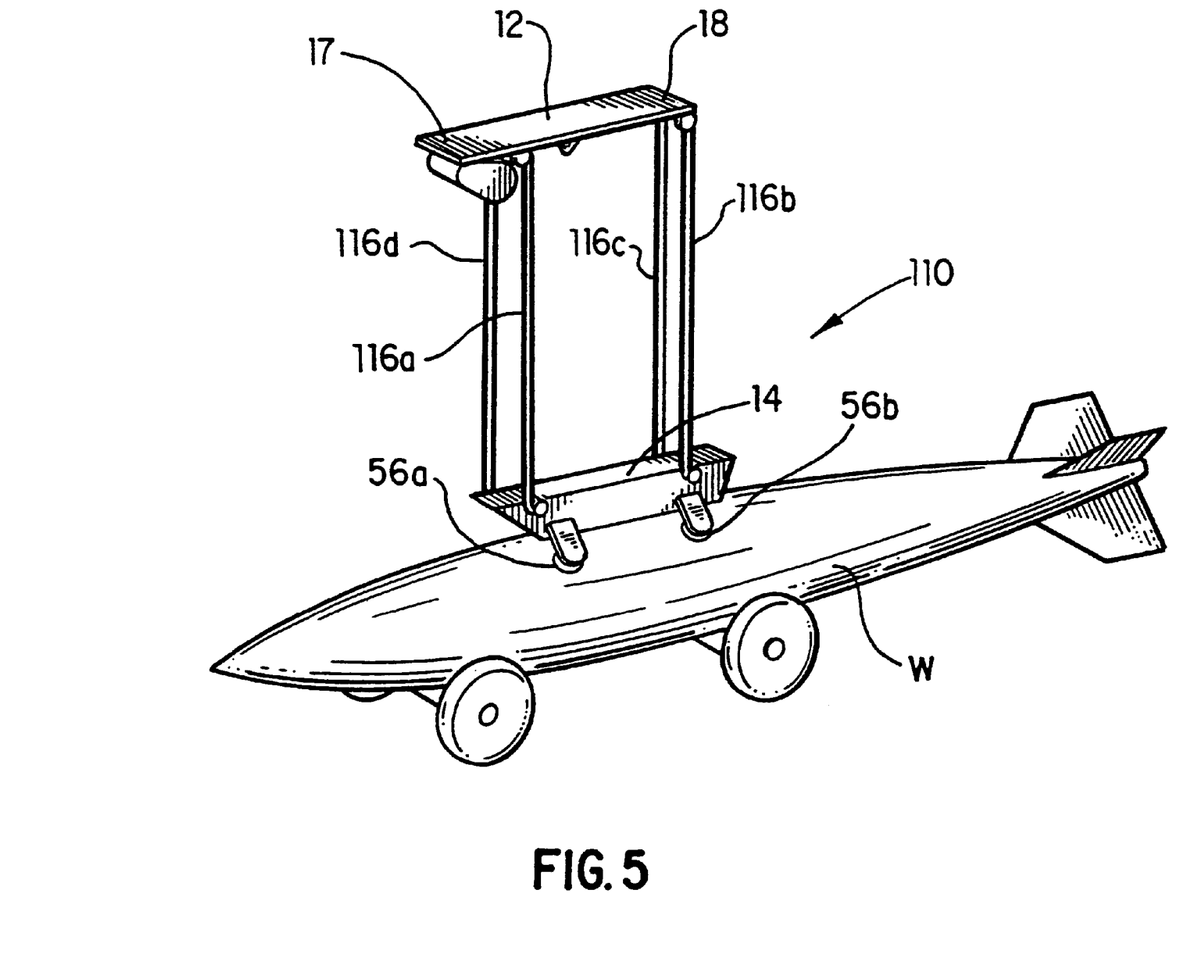
FIG. 5 is a schematic view of an integral hoist and bomb rack assembly constructed in accordance with an alternative embodiment of the present invention.

Each of the straps 16a–16d extends from a respective retrieval spool 22a 22d, around one of the winding spools 28a, 28b, 28c or 28d and into engagement with an attachment fitting mounted on rack 14. Two such attachment fittings 30a and 30b are shown in FIGS. 3 and 4. Straps 16a and 16d are wound onto "outside" retrieval spools 22a and 22d, respectively, and extend about winding spools 28a and 28d located at the forward end 17 of fitting 12. In a similar manner, straps 16b and 16c are wound onto "inside "retrieval spools 22c and 22d, respectively, and extend about winding spools 28b and 28c located at the aft end 18 of fitting 12. Straps 16a–16d are preferably formed of Kevlar or a similar high strength material and serve as the sole connection between structural fitting 12 and bomb rack 14 when these parts of the hoist and bomb rack assembly 10 are separated from one another. In place of straps 16a–16b, cables formed of synthetic material or even braided wire may be employed for suspending bomb rack 14 beneath structural fitting 12. FIG. 5 shows an alternative embodiment of an integral hoist and rack assembly 110 wherein cables 116a, 116b, 116c and 116d extend between fitting 112 and bomb rack 114. In either case, electric motor 24 provides the energy for turning spools 22a–22d to lower or lift bomb rack 14.

Referring again to the exploded view of the hoist mechanism 20 shown in FIG. 2, a linear actuator 32 is positioned between the forward winding spools 28a, 28d and the aft winding spools 28b and 28c, Actuator 32 includes an output shaft 34 pivotally attached to a drive axle 36 extending parallel to spools 22a–22d. Attached to opposite ends of drive axle 36 are similar connecting links 38a and 38b, respectively. Spaced on opposite sides of each connecting link is an uplock hook 40*a*, 40*b*, 40*c* or 40*d*, respectively. Each of the uplock hooks 40*a*–40*d* is mounted for pivoting about an axis extending parallel to drive axle 36. Each of the hooks includes a toe 42 with a protruding engagement surface 44.

As shown in FIGS. 2 and 4, an overcenter linkage assembly 46 joins each of the hooks 40*a*–40*d* to one of the links 38*a* or 38*b*. When linear actuator assembly 32 is energized, output shaft 34 moves which, in turn, causes drive axle 36 to rotate. As drive axle 36 rotates, each of the links 38*a* and 38*b* are forced to rotate. This rotation causes each overcenter linkage assembly 46 to move, thereby rotating each of the uplock hooks 40*a*–40*d* to its respective release position, wherein each toe 42 is retracted out of engagement with protruding members 67*b* supporting rack 14, thereby freeing rack 14 to separate from fitting 12 under the power of electric motor 24, as will be explained.

As shown in FIGS. 3 and 4, the rectangular fitting plate 13 includes an upper surface 50 adaptable for being bolted to an interior surface of a bomb bay or a wing pylon, not shown. Hoist mechanism 20 including linear actuator 32, spools 22*a*–22*d* and uplock hooks 40*a*–40*d* is permanently attached to the bottom surface 53 of fitting plate 13. Also mounted on the bottom surface 53 of plate 13 are a pair of alignment sockets 54*a* and 54*b* with socket 54*a* located closer to the forward end 17 of fitting 12 and socket 54*b* located closer to the aft end 18 of fitting 12. The purpose for sockets 54*a* and 54*b* will soon become clear.

Bomb rack 14 comprises a separate structure from structural fitting 12. While fitting plate 13 is fixedly mounted to the bomb bay ceiling or beneath the wing pylon, rack 14 is adaptable for being moved away from or towards fitting plate 13 as required in loading a weapon onto the aircraft. Each of the straps 16*a*–16*d* joins one of the four (4) identical attachment fittings mounted on bomb rack 14, with attachment fittings 30*a* and 30*b* shown in FIGS. 3 and 4.

Bomb rack 14 further includes a plurality of four (4) separate engagement pads or feet, with feet 56*a* and 56*b* shown in FIG. 3. Two identical feet, not shown, are mounted on the opposite side of bomb rack 14. When rack 14 advances to its loading position, the feet 56*a* and 56*b* each rest on the outer surface of a weapon W, see FIG. 1. Each of the feet 56*a* and 56*b* is adjustably mounted in a pair of support arms 57*a* and 57*b* shown in FIG. 3. As required, the individual feet 56 can be lowered or raised to achieve uniform contact with the outer surface of weapon W. Once in place, weapon hooks mounted on the rack 14, not shown, engage conventional bail lugs or missile rails mounted on the weapon W, also not shown.

As shown in FIG. 4, bomb rack 14 includes a pair of alignment pins 58*a* and 58*b* mounted on an upper surface of rack 14 facing fitting plate 13. Pins 58*a* and 58*b* are adaptable for engaging the alignment sockets 54*a* and 54*b* located on the bottom surface 53 of fitting plate 13 when rack 14 is lifted into its final position adjacent to fitting 12, thus assuring that bomb rack 14 is properly positioned beneath fitting 12.

Bomb rack 14 further includes four (4) swaybrace assemblies 60, with two of the swaybraces shown in FIGS. 3 and 4. Each of the swaybrace assemblies 60 includes a bracket 62 removably attached to rack 14 by a plurality of bolts 64 or other well known attachment means such as screws or lugs. Each bracket 62 includes a protruding member 66 located near the top surface of rack 14 and which extends outwardly from rack 14. Each protruding member 66, in turn, includes an upper surface 67*a* extending parallel to plate 13 and a side surface 67*b* extending away plate 13 and substantially perpendicular to surface 67*a*. Finally, each protruding member 66 includes a substantially L-shaped, curved surface 67*c* joining surfaces 67*a* and 67*b*. Each surface 67*c* is adaptable for engaging the toe portion 42 of one of the uplock hooks 40*a*–40*d*.

Each bracket 62 further includes a smooth, inclined upper surface 70 having an end remote from protruding member 66 that is closer to the upper surface of bomb rack 14 and an opposite end adjacent to protruding member 66 that is farther from the upper surface of rack 14, as shown in FIG. 4. A rod 72 is mounted on each bracket 62, with each rod 72 extending substantially parallel to and spaced from inclined surface 70. Slidably mounted on each rod 72 is a wedge-shaped member 74 adaptable for sliding on inclined surface 70 toward or away from protruding member 66. A separate, conventional biasing spring 75 may be employed for biasing each wedge member 74 into a predetermined position remotely positioned from its respective protruding member 66. Finally, a conventional detent assembly, also not shown, may be employed for retaining each wedge member 74 in a cocked position against the action of the biasing spring.

Before beginning a typical weapon loading cycle, the toe portion 42 of each uplock hook 40*a*–40*d* initially engages the engagement surface 67*c* of a respective protruding member 66, thereby mechanically locking fitting 12 to bomb rack 14. When it becomes necessary to load a weapon W, linear actuator 32 is energized. This causes movement of output shaft 34 and rotation of drive axle 36. This in turn actuates links 38*a* and 38*b* which activate overcenter linkages 46. Finally, the hooks 40*a*–40*d* are pivoted out of engagement with the protruding members 66 mounted on each of the swaybraces 60. Once hooks 40*a*–40*d* are disconnected from swaybrace assemblies 60, motor 24 is free to unwind straps 16*a*–16*d* and thereby lower bomb rack 14 away from fitting 12 and towards the weapon W to be loaded. After bomb rack 14 reaches its final resting position on top of weapon W, each of the wedges 74 moves its respective biasing spring 75. This action serves to cock each wedge 74. The wedges 74 are prevented from returning to their initial positions by the conventional detents or similar retaining members, not shown.

After the rack 14 is attached to weapon W as shown in FIG. 1, both the weapon W and bomb rack 14 are raised toward fitting plate 13. As the bottom surface 53 of plate 13 contacts the wedges 74, each wedge 74 is freed from its cocked position and spring biased into snug engagement between inclined surface 70 and the bottom surface 53 of fitting plate 13. The wedges 74 along with hooks 40*a*–40*d* function to maximize the locking force between fitting plate 13 and bomb rack 14. At the same time, each of the uplock hooks 40*a*–40*d* creates a mechanical lock between structural fitting 12 and rack 14 which is sufficiently strong to carry the weight of the rack 14 as well as the weapon W attached to rack 14.

Slidably mounted beneath the aft end 18 of plate 13 is a self-aligning "blind" electrical engagement member 52*a*. A compatible electrical engagement member 52*b* is mounted on the aft end of rack 14. When rack 14 is raised to its final position contacting fitting plate 13, linear actuator assembly 32 again may be actuated to slide blind engagement member 52*a* into contact with engagement member 52*b*, creating an electrical connection between fitting 12 and rack 14. The motion of linear actuator 32 further rotates linkages 46 to prevent the overcenter linkages at the hooks 40*a*–40*d* from being able to move in their open direction, thereby functioning as a safeing system.

While the preferred embodiment of the present invention employs an electric motor 24 for lowering or raising the rack, it is considered within the scope of the present invention to employ manual power for operating the hoist as well as employing any other well known energy source. Likewise, while four (4) straps are employed to lower rack 14, it is possible to employ six (6) or eight (8) or any number of straps or cables.

Although the present invention has been described in detail hereinabove, it should be clearly understood that many variations and/or modifications of the basic inventive concepts taught herein will still fall within the spirit and scope of the present invention as defined in the appended claims.

What is claimed is:

1. An integral hoist and weapon rack interface assembly for loading a weapon onto an aircraft, comprising:
   a hoist mechanism positioned at an aircraft weapon station, including a retaining mechanism mounted on the hoist mechanism:
      a plurality of flexible connectors spaced apart from one another, with each connector having a first end attached to the retaining mechanism; and
      a separate weapon rack positioned beneath the hoist mechanism with a second end portion of each connector attached to the separate weapon rack, wherein the hoist mechanism is selectively operable to lower each flexible connector and the attached weapon rack until the weapon rack is positioned to engage a weapon to be loaded, and then to raise the weapon rack and attached weapon to its loaded position adjacent the hoist mechanism.

2. An integral hoist and weapon rack interface assembly for loading a weapon onto an aircraft, comprising:
   a hoist mechanism attached to the aircraft, including a plurality of separate spools rotatably mounted along a common axis;
   a plurality of separate connecting members, each having first and second end portions, with the first end portion being attached to a separate respective one of the spools;
   a separate weapon rack disposed beneath the hoist mechanism, with the second end portion of each connecting member attached to the weapon rack for lowering and raising the weapon rack relative to the position of the hoist mechanism; and
   means for automatically locking the weapon rack and attached weapon to the hoist mechanism prior to launch of the weapon.

3. The hoist and rack interface assembly according to claim 2, wherein the hoist mechanism further includes a structural plate with four separate spools mounted end-to-end at a forward portion of the plate.

4. The hoist and rack interface assembly according to claim 3, wherein four separate connecting straps each have their first ends wound about a separate spool and their second ends attached to the weapon rack, with two straps disposed on each side of the weapon rack to balance a weapon attached to the weapon rack.

5. The hoist and rack interface assembly according to claim 4, further comprising an electrical motor mounted on the structural plate and connected to the spools for jointly rotating the spools to lower or raise the weapon rack relative to the structural plate.

6. The hoist and rack interface assembly according to claim 5, further comprising a first electrical connector mounted on the structural plate and a second electrical connector mounted on the weapon rack and aligned with the first electrical connector to form a blind connection when the weapon rack is positioned adjacent to the structural plate.

7. The hoist and rack interface assembly according to claim 2, wherein the means for automatically locking the weapon rack to the hoist mechanism includes four uplock hooks mounted on the structural plate for joint rotation about parallel axes and four swaybrace assemblies mounted on the weapon rack, with each swaybrace including a protruding member disposed for engaging one of the uplock hooks to mechanically lock the weapon rack to the structural plate.

8. The hoist and rack interface assembly according to claim 7, further comprising a wedge member mounted on each swaybrace, with each wedge member being slidable between a position nearer the protruding member and a position more remote from the protruding member, wherein the wedge members selectively engage the swaybraces and structural plate to bias the protruding members from separating from the uplock hooks.

9. The hoist and rack interface assembly according to claim 8, wherein each of the wedge members is slidably mounted on a rod mounted on each swaybrace, with a spring positioned to bias each wedge away from the protruding member and into frictional contact with the structural plate.

10. An integral hoist and weapon rack interface assembly for loading a weapon onto an aircraft, comprising:
    a hoist mechanism positioned at an aircraft weapon station, with the hoist mechanism including a structural plate supporting an electrical motor;
    a plurality of separate retaining members supported by said structural plate, wherein each retaining member comprises a rotatable spool mounted on a common axis for joint rotation by said electric motor;
    a plurality of flexible connecting members each having a first end portion mounted on a separate rotatable spool;
    a separate weapon rack positioned beneath the hoist mechanism with a second end portion of each flexible connecting member attached to the weapon rack, wherein the hoist mechanism is selectively operable to lower the plurality of flexible connecting connecting members and attached weapon rack until the weapon rack engages a weapon to be loaded, and to then raise the weapon rack and attached weapon to their loaded positions beneath the hoist mechanism; and
    a lock mechanism mounted on the structural plate for selectively engaging the weapon rack in order to prevent undesired separation of the weapon rack and attached weapon from the hoist mechanism.

11. The hoist and rack interface assembly according to claim 10, wherein each of the connecting members comprises a strap having a first end wound on one of the rotatable spools and a second end attached to the weapon rack, whereby selective operation of the electric motor serves to jointly unwind all of the spools and lower each strap and the attached weapon rack from a location immediately beneath the structural plate and into contact with the weapon to be loaded.

12. The hoist and rack interface assembly according to claim 11, wherein four rotatable spools are mounted on the structural plate with a separate strap attached to each spool, wherein a pair of straps are attached to each side of the weapon rack.

13. The hoist and rack interface assembly according to claim 10, wherein each of the connecting members comprises a cable having a first end wound on one of the rotatable spools and a second end attached to the weapon rack, whereby selective operation of the electric motor serves to jointly unwind all of the spools and lower each cable and the attached weapon rack from a location directly beneath the structural plate and into contact with the weapon to be loaded.

14. The hoist and rack interface assembly according to claim 10, wherein the lock mechanism comprises a plurality of separate uplock hook members mounted for joint rotation about parallel extending axes.

15. The hoist and rack interface assembly according to claim 14, wherein the lock mechanism further comprises a plurality of swaybrace assemblies each mounted on outer surfaces of the weapon rack, with each swaybrace assembly including a protruding member selectively engagable with one of said separate uplock hook members, whereby each uplock hook member hooks one of the protruding members to mechanically lock the weapon rack against separation from the structural plate.

16. The hoist and rack interface assembly according to claim 15, wherein the lock mechanism further comprises an actuator having an output connected to an overcenter linkage system which is connected to each of the separate uplock hook members, whereby operation of the actuator serves to initiate movement of the overcenter linkage which rotates all of the separate uplock hook members out of engagement with their respective protruding members, allowing the weapon rack to separate from the structural plate.

17. The hoist and rack interface assembly according to claim 16, wherein movement of the weapon rack towards the structural plate causes the protruding members to engage the separate uplock hook members thereby initiating movement of the overcenter linkage to automatically pivot each of the separate uplock hook members into engagement with the protruding members to mechanically lock the weapon rack into position beneath the structural plate.

18. The hoist and rack interface assembly according to claim 15, wherein a wedge is mounted on each swaybrace assembly, with each wedge being slidable between a position nearer the protruding member and a position more remote from the protruding member, wherein the wedges selectively engage the swaybrace assemblies and structural plate to bias the protruding members from separating from the plurality of separate uplock hook members.

* * * * *